United States Patent [19]

Zhao

[11] Patent Number: 5,349,645
[45] Date of Patent: Sep. 20, 1994

[54] WORD HYPOTHESIZER FOR CONTINUOUS SPEECH DECODING USING STRESSED-VOWEL CENTERED BIDIRECTIONAL TREE SEARCHES

[75] Inventor: Yunxin Zhao, Santa Barbara, Calif.

[73] Assignee: Matsushita Electric Inductrial Co., Ltd., Kadoma, Japan

[21] Appl. No.: 807,255

[22] Filed: Dec. 31, 1991

[51] Int. Cl.$^5$ ............................................. G10L 9/00
[52] U.S. Cl. .................................. 395/2.52; 395/2.64
[58] Field of Search ................................. 381/29–51; 395/2.53, 2.64

[56] References Cited

U.S. PATENT DOCUMENTS 4,882,759  11/1989  Bahl et al. ............................. 381/36

OTHER PUBLICATIONS

"A Fast Approximate Acoustic Match for Large Vocabulary Speech Recognition" by L. R. Bahl et al., pp. 156–158, Dec. 1990.

"Continuous Speech Recognition with Vowel-Context-Independent Hidden-Markov-Models for Demisyllables" by Walter Weigel, pp. 701–703, Dec. 1990.

"The Foward-Backward Search Algorithm" by Steve Austin et al., pp. 697–700, IEEE, 1991.

"Fast Look-Ahead Pruning Strategies in Continuous Speech Recognition" by Xavier L. Aubert, pp. 659–662, IEEE, 1989.

"Interaction Between Fast Lexical Access and Word Verification in Large Vocabulary Continuous Speech Recognition" by L. Fissore et al. pp. 279–282, IEEE, 1988.

"Experiments with a Speaker-Independent Continuous Speech Recognition Sytstem on the Timit Database" by Yunxin Zhao et al. pp. 697–700, Jan. 1989.

"An HMM Based Speaker-Independent Continuous Speech Recognition System with Experiments on the TIMIT Database" by Yunxin Zhao et al., pp. 333–336, Nov. 1991, IEEE.

*Primary Examiner*—Allen R. MacDonald
*Assistant Examiner*—Michelle Doerrler
*Attorney, Agent, or Firm*—Price Gess & Ubell

[57] ABSTRACT

A word hypothesis module for speech decoding consists of four submodules: vowel center detection, bidirectional tree searches around each vowel center, forward-backward pruning, and additional short words hypotheses. By detecting the strong energy vowel centers, a vowel-centered lexicon tree can be placed at each vowel center and searches can be performed in both the left and right directions, where only simple phone models are used for fast acoustic match. A stage-wise forward-backward technique computes the word-beginning and word-ending likelihood scores over the generated half-word lattice for further pruning of the lattice. To avoid potential miss of short words with weak energy vowel centers, a lexicon tree is compiled for these words and tree searches are performed between each pair of adjacent vowel centers. The integration of the word hypothesizer with a top-down Viterbi beam search in continuous speech decoding provides two-pass decoding which significantly reduces computation time.

30 Claims, 9 Drawing Sheets

WORD HYPOTHESIZER FOR CONTINUOUS SPEECH DECODING USING STRESSED-VOWEL CENTERED BIDIRECTIONAL TREE SEARCHES

BACKGROUND OF THE INVENTION

1. Field of the Invention

The present invention relates to speech recognition in general and, specifically, to word hypothesis in continuous speech decoding using HMM phone models.

2. Description of Related Art

The tremendous complexity that exists in continuous speech decoding processes is due to the uncertainty of word identities and their locations in an utterance. As vocabulary size and complexity increase, the decoding process usually becomes extremely computationally expensive. A two-pass decoding strategy, which employs a fast acoustic match to prepare a partial or complete word hypothesis lattice over an utterance in the first pass and a detailed decoding guided by the word lattice in the second pass, can significantly reduce the search complexities. There have been a few efforts in this direction. Micro-segments of broad classification units were used in generating word hypothesis lattice; see L. Fissore et al., "Interaction Between Fast Lexical Access and Word Verification in Large Vocabulary Continuous Speech Recognition," Proc. ICASSP, pp. 279-282, New York, N.Y., 1988. Broad classification-based acoustic match was used to constrain search path by looking ahead a context size of a phoneme or word; see X. L. Aubert et al., "Fast Look-Ahead Pruning Strategies in Continuous Speech Recognition," Proc. ICASSP, pp. 659-662, Glasgow, Scotland, 1989. A statistical grammar-guided backward pass over the entire sentence was used to generate partial path scores and word candidates for a detailed forward N-best decoding; see S. Austin et al., "The forward-Backward Search Algorithm," Proc. ICASSP, pp. 697-700, Toronto, Canada, 1991.

In spite of its complicated nature, the speech signal exhibits prominent feature regions of high energy vowels. The vowels represent syllabic nuclei. Using the vowel centers as anchor points of syllables or demisyllables, the task of continuous speech decoding may be accomplished with reduced complexity. An effort in this direction can be found in work done for continuous speech recognition in the German language; see W. Weigel et al., "Continuous Speech Recognition with Vowel-Context-Independent Hidden Markov Models for Demisyllables," Proc. ICSLP, pp. 701-704, Kobe, Japan, Nov. 1990. The structure of lexicon representation is also a factor in the speed of decoding, where a tree structure is a more efficient representation than a linear structure; see L. R. Bahl et al., "A Fast Approximate Acoustic Match for Large Vocabulary Speech Recognition," Proc. EuroSpeech, pp. 156-158, Paris, France, Sep. 1989.

In spite of these research efforts, there still exists a need for a word hypothesis module for use with continuous speech recognition systems which will process complex tasks and large vocabularies without a concomitant increase in computational expense.

SUMMARY OF THE INVENTION

The present invention accomplishes its objective by, in part, representing a lexicon in an efficient structure of a vowel-centered tree which is rooted in the primary stressed-vowels of lexicon entries. By using the characteristics of the strong vowel regions of speech signals for word hypothesis, decomposition of a sequential task can be accomplished by a straightforward parallel computation. A bidirectional tree search, which starts from each vowel center, is utilized for efficient computation in the word hypothesis process. The hypothesized word boundaries are refined by using a stage-wise iterative computation technique to compute the word-beginning and word-ending likelihood scores in the entire utterance of continuous speech. Fast decoding is obtained by using a two-pass decoding scheme. The first pass performs the stressed-vowel centered tree searches using relatively simple phone models. The second pass performs a top-down Viterbi beam search using detailed phone models with the search path constrained by the word lattice generated during the first pass.

It is an object of the present invention to represent a lexicon in an efficient structure of a vowel-centered tree which is rooted at the primary stressed-vowels of lexicon entries.

It is another object of the present invention to use the characteristics of strong vowel regions of speech signals for word hypothesis, which leads to a decomposition of a sequential task to a straightforward parallel computation.

It is a further object of the present invention to use the bidirectional tree searches which start from each vowel center for efficient computation in word hypothesis.

It is yet another object of the present invention to refine the hypothesized word boundaries by using a stage-wise iterative computation technique to compute the word-beginning and word-ending likelihood scores in the entire utterance of continuous speech.

It is still further an object to use a two-pass decoding strategy for faster decoding. The first pass performs the stressed-vowel centered tree searches using relatively simple phone models, and the second pass performs a top-down Viterbi beam search using detailed phone models, where the search paths are constrained by the word lattice generated in the first pass.

BRIEF DESCRIPTION OF THE DRAWINGS

The exact nature of this invention, as well as its advantages, will be readily understood from consideration of the following detailed description when considered in conjunction with the accompanying drawings, in which like reference numerals designate like parts throughout the figures thereof, and wherein.

DESCRIPTION OF THE PREFERRED EMBODIMENTS

Figure 1:
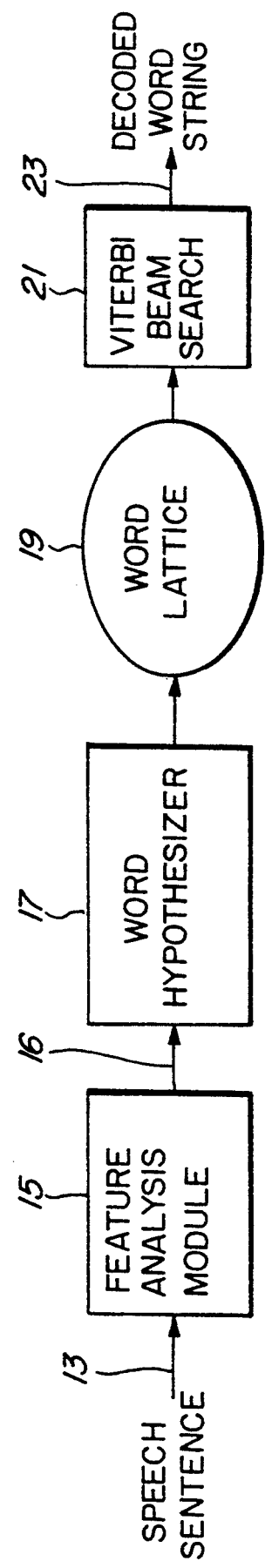
FIG. 1 is a block diagram of a continuous speech decoding system.

The present invention is implemented as a module for word hypothesis in systems of continuous speech recognition as illustrated in FIG. 1. The speech data 13 of an utterance is first converted into a sequence of feature vectors 16 by the feature analysis module 15. The feature sequence 16 is then passed into the word hypothesizer 17, which generates a word lattice 19 according to the technique of the present invention, which will be described below. The word lattice 19 from the word hypothesizer is then used as word evidence regions to guide the detailed Viterbi beam search 21.

Figure 2:
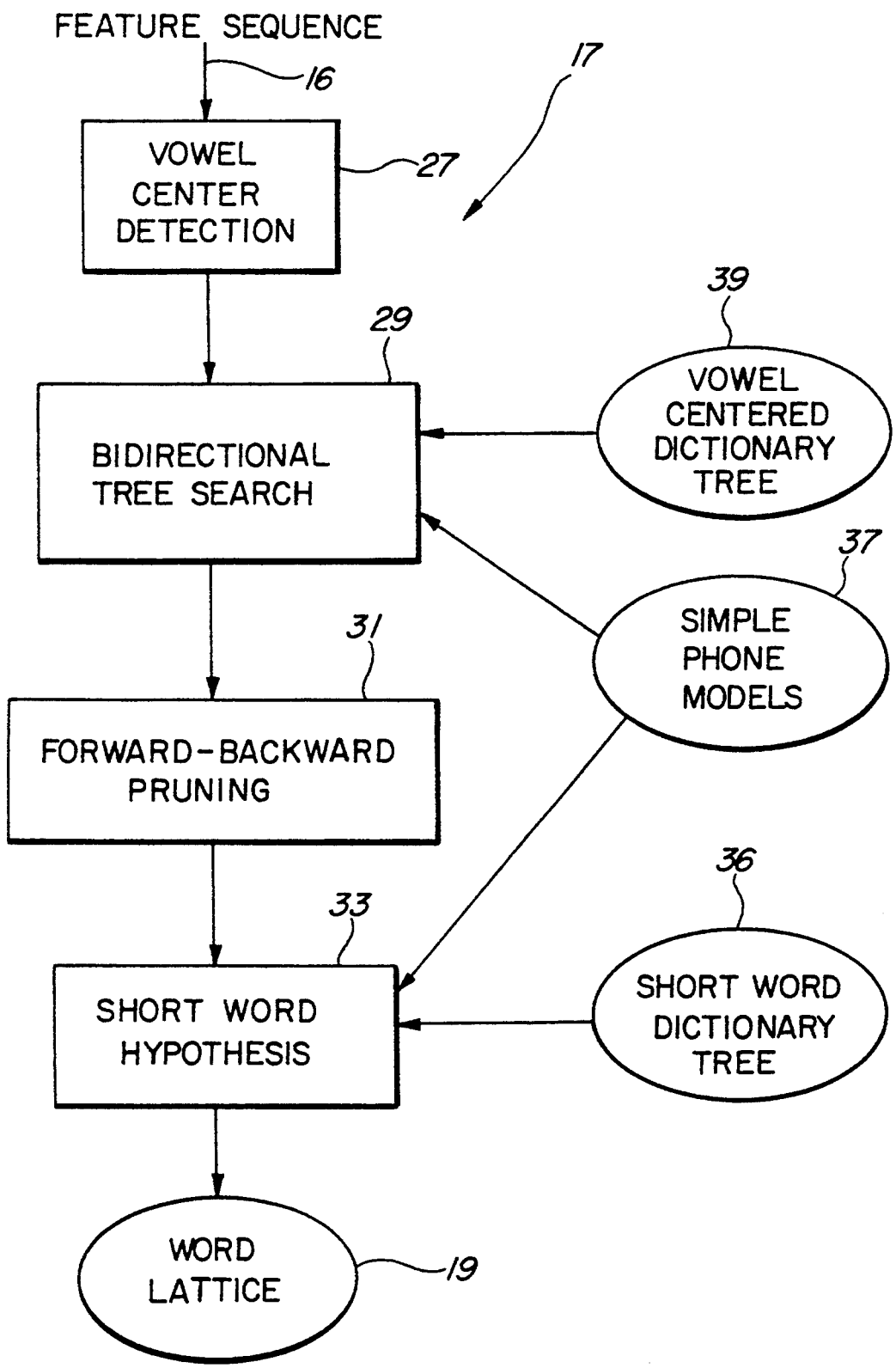
FIG. 2 is a flow chart of the word hypothesis according to the present invention.

FIG. 2 is a flow diagram of the word hypothesis 17 of FIG. 1.

As is illustrated in FIG. 2, a vowel-centered dictionary tree 39 is used in the word hypothesizer.

Since every multisyllable word in English has a primary stressed vowel, and only a very small percentage of monosyllabic words do not have stress, an English lexicon can be organized around the primary stressed vowels of words. The few words without a stress can simply be organized around their vowel centers for uniformity. Using a tree structure, a lexicon can be represented by a vowel-centered tree rooted in the primary stressed vowels. The left subtree characterizes the lexicon structure on the left side of the stressed vowels. The right subtree characterizes the lexicon structure on the right side of the stressed vowels. Both the left and right subtrees start from the stressed vowels. A conventional lexicon tree is based on the left-to-right order of the subword units in word transcriptions.

Figure 3:
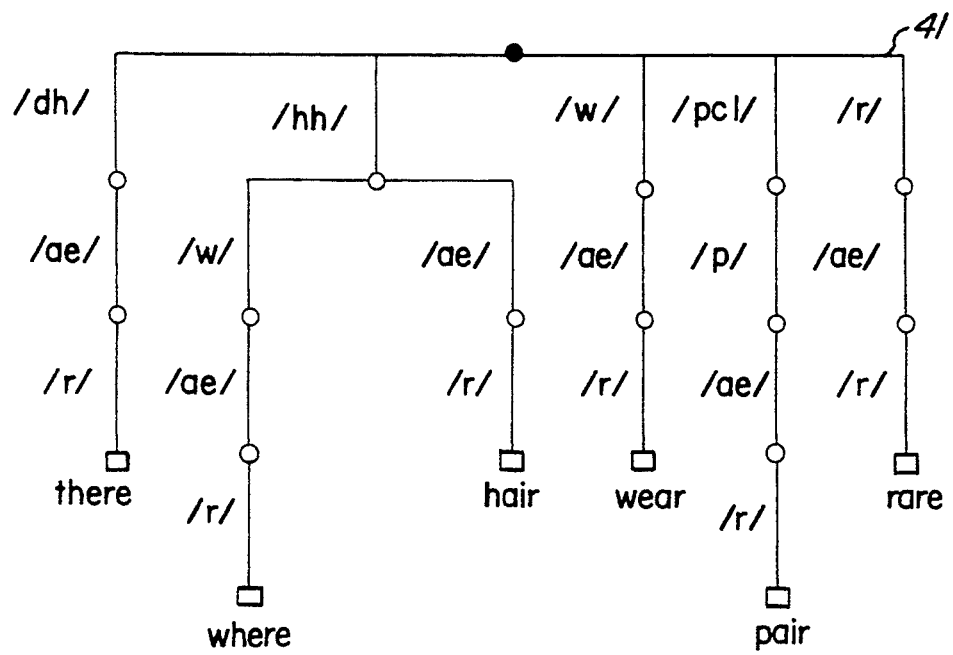
FIG. 3 is an example of a conventional dictionary tree.
Figure 4:
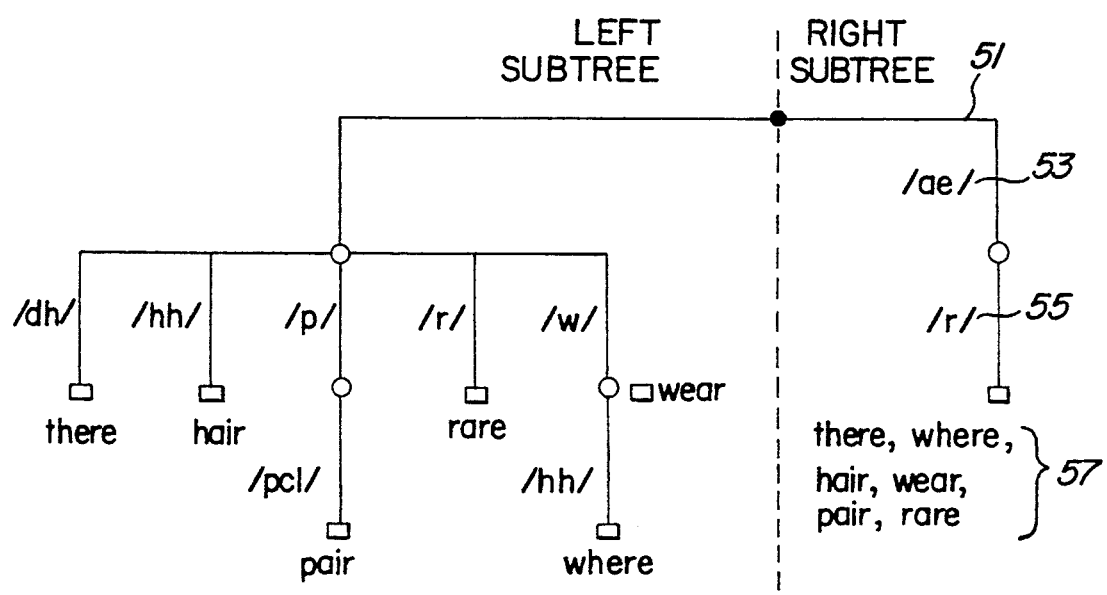
FIG. 4 is an example of a vowel-centered dictionary tree.

In FIGS. 3 and 4, a conventional tree 41 and a vowel-centered tree 51, respectively, are constructed for a set of six words: there, where, hair, wear, pair, rare. For this specific example, the conventional tree requires 19 branches, and the vowel-centered tree requires only 10 branches. The significant saving of branches in the latter representation is due to the sharing of the common units /ae/ 53 and /r/ 55 in the right subtree. As can be seen in FIG. 4, the six words 57 are ended at a single leaf node in the right subtree. Although this may be an extreme example, in general, the vowel-centered tree requires significantly fewer branches than a conventional tree. Consistent with the increased compactness of representation, confusable words also have a better chance to be clustered together as a single leaf node in either the left or right subtrees.

The vowel center detection block 27 in FIG. 2 estimates the locations of stressed vowel centers. The energy values are calculated for each frame and transformed into a logarithmic scale. Let e(t) be the logarithmic energy at the frame t, which is calculated from speech samples s(n) by $$e(t) = \log \sum_{k=-\frac{L}{2}}^{k=\frac{L}{2}} s^2(n_t + k),$$

where L is the frame length. To reduce spurious energy peaks, a smoothing is performed in a small neighborhood K, i.e., $$e(t) = \frac{1}{K} \sum_{k=-\frac{K}{2}}^{k=\frac{K}{2}} e(t + k).$$

Figure 5:
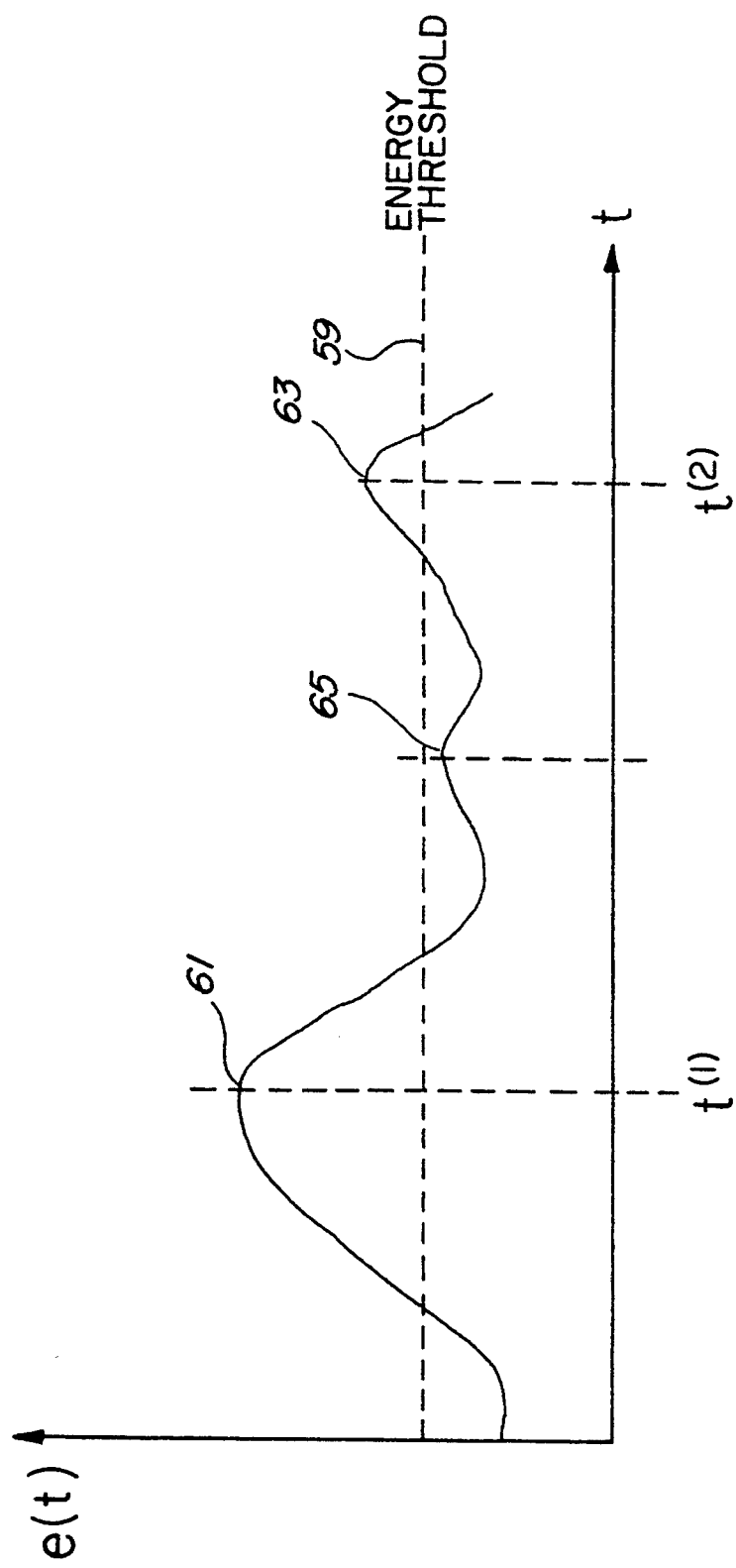
FIG. 5 is an example of energy-peak selection according to an energy threshold.

The peaks are defined as the points where $e(t) > e(t-1)$ and $e(t) > e(t+1)$. To reduce the chance that a peak actually comes from consonants instead of vowels, an energy threshold 59 is used to prune away the peak 65 with values below the threshold, and its acoustic best is not a vowel. FIG. 5 illustrates the selection of two peaks 61, 63 from among three, where the center one 65 was rejected due to its low energy value. The time indices of the detected N energy peaks $t^{(1)}, \ldots, t^{(N)}$ are passed to the bidirectional tree search block 29.

In the bidirectional tree search block 29, the likelihood scores of the feature vector $\chi_t$, $t=1, \ldots, T$ are calculated for each phone model $u_m$: $p(\chi_t|u_m)$, $m=1, \ldots, M$. The phone models from simple phone models block 37 can be as simple as a single Gaussian density $N(\mu_m, C_m)$ per phone, and the score $p(\chi_t|u_m)$ is evaluated as $$p(\chi_t|\mu_m) = \frac{1}{(2\pi)^{n/2}|C_m|^{1/2}} \exp\left(-\frac{(\chi_t - \mu_m)'C_m^{-1}(\chi_t - \mu_m)}{2}\right),$$

where n is the dimension of the feature. For a more specific description of feature vector and phone models, see Y. Zhao et at., "Experiments with a Speaker-Independent Continuous Speech Recognition System on the TIMIT Database," Proc. ICSLP, pp. 697–700, Kobe, Japan, Sep. 1990, and Y. Zhao et al., "An HMM Based Speaker-Independent Continuous Speech Recognition System with Experiments on the TIMIT Database," Proc. ICASSP, Toronto, Canada, May 1991. These references are incorporated herein as if set forth verbatim. The likelihood scores for the paths from the tree search are calculated as follows:

A node in a tree of the type shown in FIG. 4 from vowel centered dictionary tree block 39 is denoted as $(l, i_l)$, where l and $i_l$ are the respective indices of layer and branch in the tree. The phone unit corresponding to the node $(l, i_l)$ is denoted as $b_{l,i_l}$. The root (0,0) of a vowel-centered tree is a null node. Let $t_0$ be the time index of the current vowel center. Let $\chi_t$ denote the feature vector at time frame t, and $y_{t_0}{}^t$ be the sequence of feature vectors from $t_0$ to t, i.e., $$y_{t_0}{}^t = \chi_{t_0}\chi_{t_0+1}\cdots\chi_t.$$

Let $t_{j-1}$ and $t_j - 1$ specify the start and end time of the layer j. The likelihood score of $y_{t_0}{}^t$ being decoded by the node sequence $(1, i_1), (2, i_2), \ldots, (1, i_l)$, where each node is a child of its immediately previous node, is defined as $$\phi(y_{t_0}^t|b_{1,i_1}, b_{2,i_2}, \ldots, b_{l,i_l}) =$$

-continued $$\max_{t_{l-1},\ldots,t_1} p(y^t_{t_l-1}|b_{l,il}) \prod_{j=1}^{l-1} p(y^{t_j-1}_{t_{j-1}}|b_{j,ij}),$$

where $$p(y^{t_j-1}_{t_{j-1}}|b_{j,ij}) = \prod_{t'=t_{j-1}}^{t_j-1} p(x_{t'}|b_{j,ij}).$$

The likelihood is computed recursively, and the use of log likelihoods replaces the multiplication by summation:

$$\log\phi(y^t_{t_0}|b_{1,i1}, b_{2,i2}, \ldots, b_{l,il}) = \qquad (1)$$

$$\begin{cases} \log p(x_{t_0}|b_{1,i1}) & t = t_0 \\ \max \{\log \phi(y^{t-1}_{t_0}|b_{1,i1}, \ldots, b_{l-1,il-1}), \\ \log \phi(y^{t-1}_{t_0}|b_{1,i1}, \ldots, b_{l,il})\} + \log p(x_t|b_{l,il}). & t > t_0 \end{cases}$$

The tree search uses likelihood thresholds prune away nodes of low likelihood. Two likelihood values are used as reference for threshold adaptation. One is the maximum likelihood value from the current tree search ending at the current time frame, i.e., $$\phi^* = \max_{l_{i1,i2},\ldots,i_1} \phi(y^t_{t_0}|b_{1,i1},\ldots,b_{1,i1}),$$

which is updated as the likelihood scores of new nodes are calculated. The other is the accumulated maximum likelihood score of each frame without the tree constraint, i.e., $$\prod_{t'=t_0}^{t} \max_m p(x_{t'}|\mu_m),$$

where the $u_m$'s denote the phone units. A new node (l, i$_l$) is accepted if the two threshold conditions are satisfied: and $$\log \frac{\phi(y^t_{t_0}|b_{1,i1},\ldots,b_{l,il})}{\phi^*} > Th(1)$$

$$\log \frac{\phi(y^t_{t_0}|b_{1,i1}, b_{2,i2},\ldots,b_{l,il})}{\phi^{**}} > Th(2)$$

The thresholds Th(1) and Th(2) are both chosen as functions of the absolute distance between the current time frame and the current vowel center, i.e., $d(t,t_0)=|t-t_0|$. The thresholds are empirically taken as linear functions of the distance with lower and upper bounds:

$$f(d) = \begin{cases} f_0 & d \leq d_0 \\ \alpha(d - d_0) + f_0 & d_0 < d < d_1 \\ \alpha(d_1 - d_0) + f_0 & d \geq d_1. \end{cases} \qquad (2)$$

Figure 6:
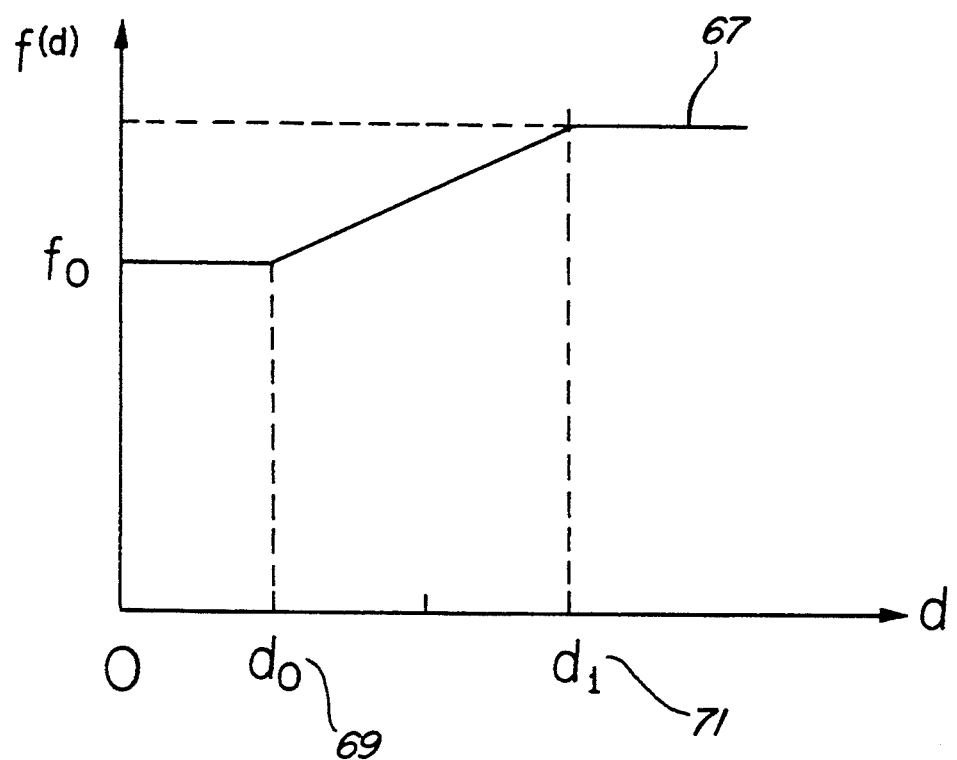
FIG. 6 illustrates the likelihood threshold as a function of distance from the vowel center.

FIG. 6 illustrates the function 67 described by Equation (2). A threshold Th(1) compares the likelihood of nodes expanded from the tree search and, therefore, provides a basis for time synchronous node pruning. A threshold Th(2) compares the likelihood of a path in the tree search with the accumulated path-independent maximum likelihood, and it is used to limit the search depth. An increase in the threshold value with an increase of search depth is intended to give more mismatch allowance to long words. The tree search terminates when no nodes satisfy the two threshold conditions. Both choices of threshold Th(1) and threshold Th(2) are based on the compromising needs of search efficiency and reliability. A low threshold value leads to fast pruning of search paths, but creates a greater chance of losing a desirable candidate hypothesis. A high threshold value has more chances of including desirable candidate hypotheses, but leads to slower path searches. Both threshold values are preferably fine tuned experimentally.

Imposing duration constraints on HMM phone models is useful for reducing spurious word hypotheses. On the other hand, keeping track of the phone durations on each search path requires extra computation. Since the word hypothesis is intended as a task with low computation cost, a compromising approach is preferable. Specifically, a minimum time threshold is maintained for each layer so that only when the threshold is reached, can a branch at that layer be started. A minimum phone duration of two frames has yielded good results in a previous study by the present inventor; see Y. Zhao et al., "Experiments with a Speaker-Independent Continuous Speech Recognition System on the TIMIT Database," Proc. ICSLP, pp. 697–700, Kobe, Japan, Sep. 1990. The contents of that paper are incorporated herein as if set forth verbatim. The time threshold in the tree search is accordingly defined so that the branches on the jth layer cannot start until the search depth d(t,t$_0$) reaches 2(j−1). Incorporating the time threshold into Equation (1), the recursive computation is redefined as $$\log\phi(y^t_{t_0}|b_{1,i1}, b_{2,i2}, \ldots, b_{l,il}) =$$

$$\begin{cases} \log p(x_{t_0}|b_{1,i1}) & t = t_0 \\ \max \{\log \phi(y^{t-1}_{t_0}|b_{1,i1}, \ldots, b_{l-1,il-1}), & \text{if } d(t, t_0) \geq \\ \log \phi(y^{t-1}_{t_0}|b_{1,i1}, \ldots, b_{l,il})\} + \log p(x_t|b_{l,il}) & 2(l - 1) \\ -\infty & \text{otherwise.} \end{cases}$$

While the use of layer time threshold reduces spurious word hypotheses, it does not require extra computation. In fact, search time is also reduced since many node expansions are avoided.

Sometimes an energy peak occurs not in the vowel region, but a few frames into the liquid region, i.e., the stress is a syllable stress. To handle such a shift of energy peak, the nodes on the layer of stressed-vowels are modeled by mixtures of the respective vowel phone models $N(\mu_m,C_m)$ and a liquid-vowel syllable model $N(\mu_{syl},C_{syl})$, an equal weighting can be applied to each model.

The leaf nodes occurring on the left or right tree searches are recorded as half word hypotheses: $l(\omega_k)$ and $r(\omega_k)$ for word $\omega_k$. The likelihood scores of the leaf nodes occurring at the same time frame are compared and those with poor scores are pruned away. A threshold, Th(3), for pruning is taken as a function of the number of occurring leaf nodes. The function is similar in form to Equation (2), with a change of the lower saturation bound by a linear function of unit slope. In this way, when the number of occurring leaf nodes is fewer than a lower threshold $d_0$ 69, all hypotheses are accepted; when the number is between the lower and upper thresholds $d_0$ 69 and $d_1$ 71, a fraction of the hypothesis is accepted; when the number is above the upper threshold 71, only a fixed number of hypotheses is accepted.

A leaf node usually occurs in a cluster of adjacent frames. For each vowel center, the leaf-node occurrence time and the associated likelihood scores are recorded for both left and right half-word hypotheses. The half-word hypotheses form a word lattice for further processing by the forward-backward pruning operation 31.

The forward-backward pruning operation 31 operates on the half-word lattice. The pruning is based on the cumulative likelihood scores from the previous vowel centers up to the current vowel center, whereas the pruning in the bidirectional tree search is based solely on the likelihood scores from one vowel center.

Figure 7:
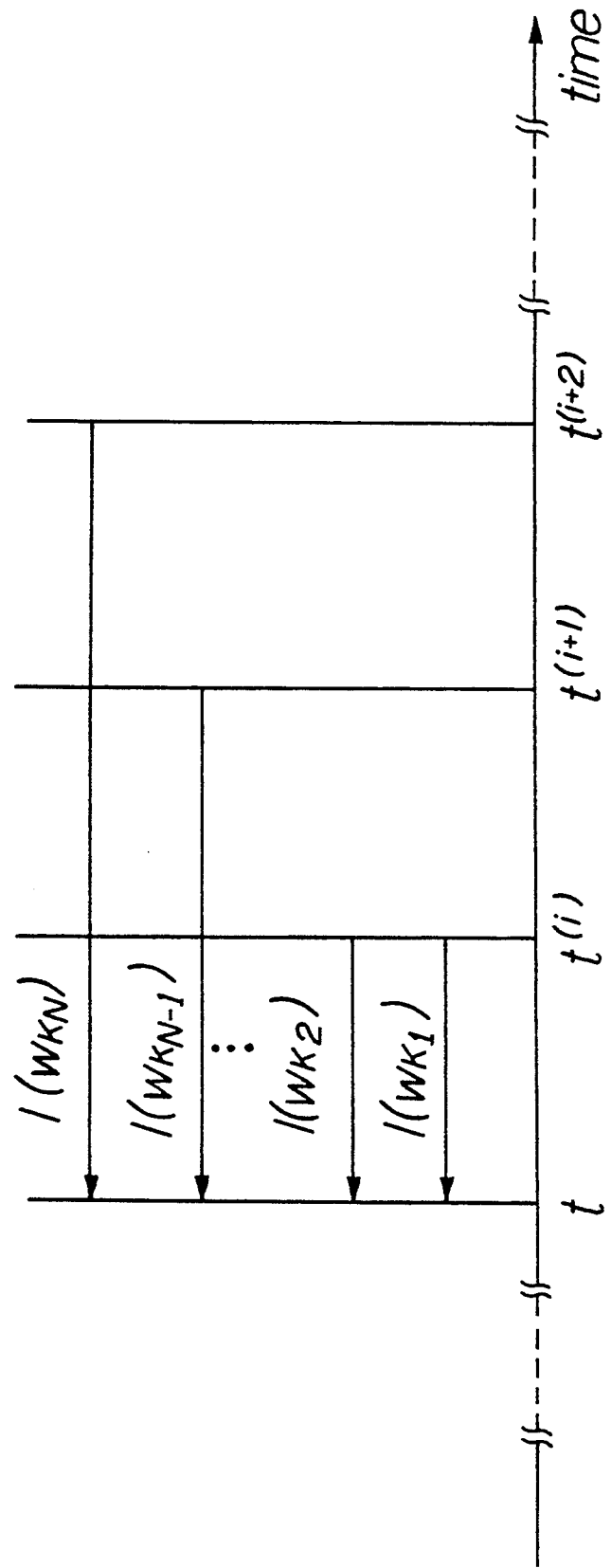
FIG. 7 illustrates the occurrence of left-half words from different vowel centers at the same time frame.

FIG. 7 illustrates the pruning of word-beginning hypotheses through the backward pass, where the hypotheses at each time frame from all vowel centers are compared and those with high likelihood scores are kept. Both the forward and backward passes consist of three basic steps, and iterate from the first vowel center $t^{(1)}$ to the last vowel center $t^{(N)}$ for the forward pass and vice versa for the backward pass. The computation for the forward pruning of word-ending hypothesis is described as follows.

Initialization

Compute the cumulative silence likelihood scores from the sentence beginning to the first vowel center, where $u_{sil}$ denotes the phone unit of silence:

$$\log p(y_1{}^t | \mu_{sil}) = \sum_{t'=1}^{t} \log p(\chi_{t'} | \mu_{sil}), \ t = 1, 2, \ldots, t^{(1)}.$$

For the vowel centers i=1,2, ..., N, repeat steps 1, 2, and 3:

Step 1

Figure 8:
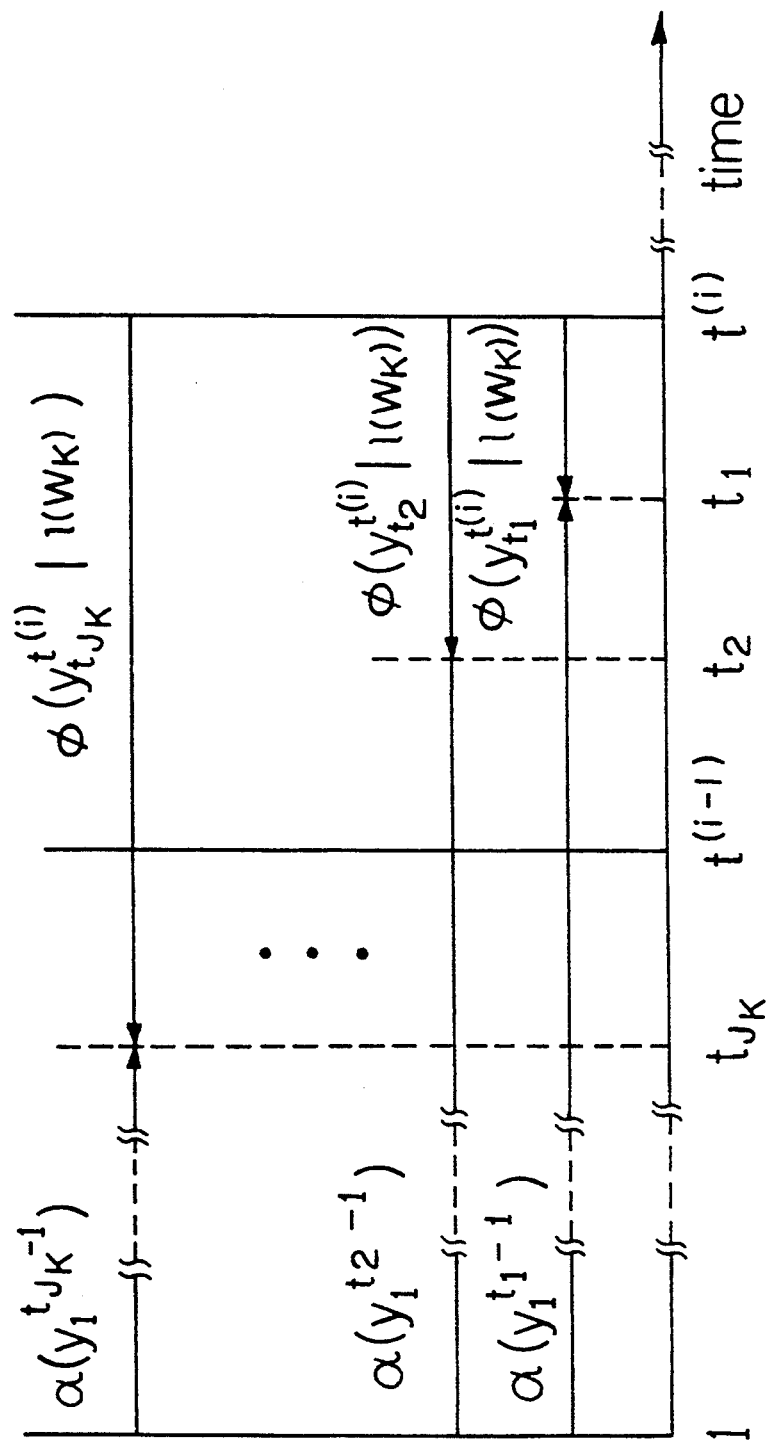
FIG. 8 illustrates the computation of $$\log q(y_1^{t(i)} | l(\omega_k)).$$

The computation in this step is illustrated in FIG. 8. Let $a(y_t)$ be the maximum likelihood score over all possible paths ending at t, and let the beginning times of the word $\omega_k$ from the vowel center i be $t_j$, j=1,2, ..., $j_k$. Then the maximum likelihood score of all possible paths that end at the stressed-vowel of $\omega_k$ at time $t^{(i)}$ is calculated as $$\log q(y_1^{t(i)} | l(\omega_k)) = \max_j \{\log a(y_1^{t_j-1}) + \log \phi(y_{t_j}^{t(i)} | l(\omega_k))\}.$$

The likelihood score of $\log q(y_1{}^{t(i)} | l(\omega_k))$ is computed for all the word-beginning hypotheses generated at the vowel center i.

Step 2

Figure 9:
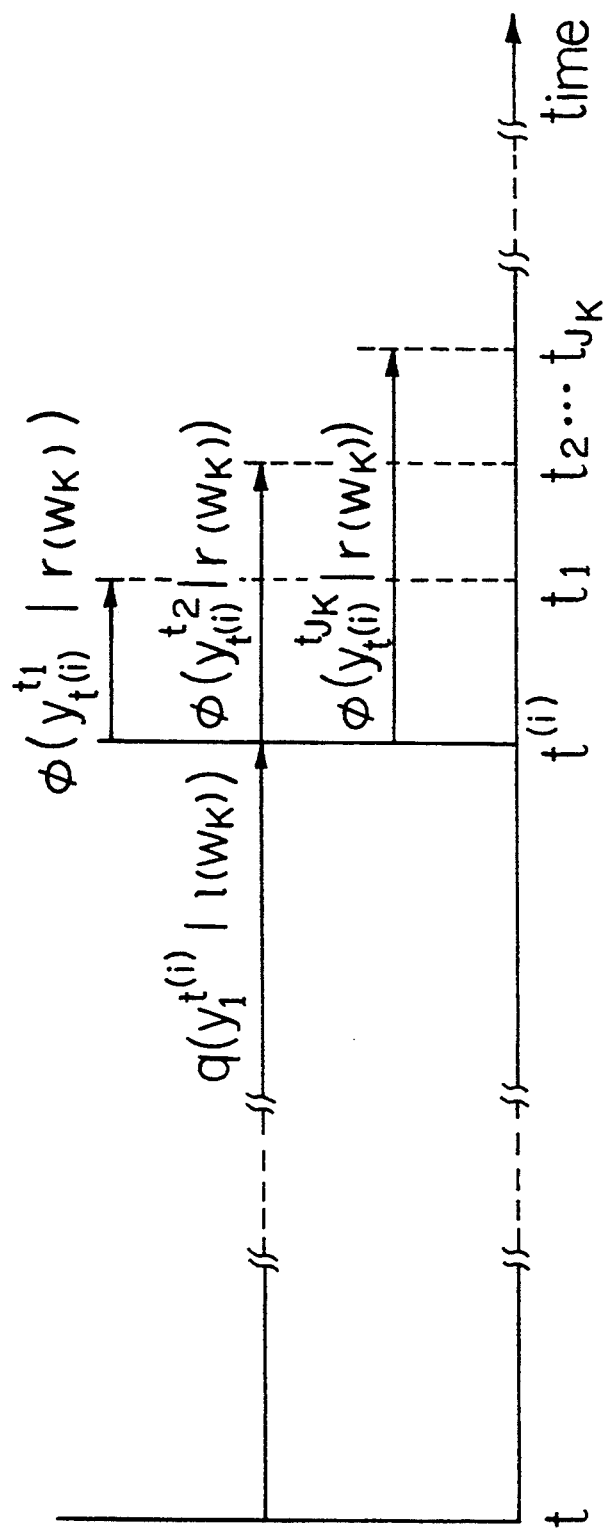
FIG. 9 illustrates the computation of $$\log \phi_e(y_1{}^{ij}|\omega_k).$$

FIG. 9 illustrates the computation in this step. Let the ending time of the word $\omega_k$ from the vowel center i be $t_j$, j=1,2, ..., $J_k$. Then the maximum likelihood scores of the paths that end with $\omega_k$ at $t_j$, j=1,2, ..., $J_k$ are calculated as $$\log \phi_e(y_1{}^{t_j} | \omega_k) = \log q(y_1{}^{t(i)} | l(\omega_k)) + \log \phi(y_{t(i)}{}^{t_j} | r(\omega_k)) - \log p(\chi_{t(i)} | b_{l,i1}),$$

where $b_{l,i1}$ is the phone unit of the stressed vowel (or the mixture model) for the word $\omega_k$. The subtraction of log $p(\chi_{t(i)} | b_{l,i1})$ is to eliminate the duplicate score at the vowel center $t^{(i)}$ shared by the left and right tree searches. The likelihood scores are computed for all k hypothesized at the vowel center i.

Step 3

Since all the word ending likelihood scores at time $t^{(i)} < t \leq t^{(i+1)}$ ($t^{(i)} < t \leq T$, when i=N) are available after Step 2, the scores at each t are sorted into a descending order:

$$\phi_e(y_1{}^t | \omega_{k1}) \geq \phi_e(y_1{}^t | \omega_{k2}) \geq \ldots \geq \phi_e(y_1{}^t | \omega_{kM(t)}),$$

where M(t) is the number of word hypotheses at time t. Only the candidates up to k=M'(t) are kept, where the ratio of the M'(t)th likelihood to the maximum likelihood is above a threshold Th(4):

$$\log \frac{\phi_e(y_1{}^t | \omega_{kM'(t)})}{\phi_e(y_1{}^t | \omega_{k1})} \geq Th(4) > \log \frac{\phi_e(y_1{}^t | \omega_{kM(t)+1})}{\phi_e(y_1{}^t | \omega_{k1})}.$$

The best history probability is updated by selecting the maximum of the word-ending likelihood and the likelihood of the one-step extension of the silence node, i.e., $$\log a(y_t) = \max\{\log \phi_e(y_1{}^t | \omega_{k1}), \log a(y_1{}^{t-1}) + \log p(\chi_t | \mu_{sil})\}.$$

The backward pruning of the word-beginning hypotheses proceeds as the above-described forward pruning, only with a reverse of temporal order.

The short-word hypothesis procedure 33 handles the potentially difficult-to-detect short words, since the short words are usually softly and vaguely pronounced. Short words which begin or end with vowels also occasionally have their vowel centers lost when they occur adjacent to long words with either stressed word-initial vowels or stressed word-ending vowels. Short-word hypothesis procedure 33 uses a small dictionary tree 36 of conventional structure which is compiled from short function words and short words with word-initial vowels or word-ending vowels. Searches of short words are performed between each pair of adjacent vowel centers using the small dictionary tree 36.

The likelihood score of inserting a short word between t and t' into the word lattice is evaluated by adding its path score from the small tree search to the best forward path score $a(y_1{}^{t-1})$ and the best backward path score $\beta(y_{t'+1}{}^T)$, so that the scores add up as a sentence likelihood. Again, only well-scored short word hypotheses are accepted. A constraint is imposed so that a search path terminates when a leaf occurs, i.e., the occurrence of a leaf node will not lead to an extension into another tree search. Since the small dictionary tree of short words is of a significantly smaller size than the dictionary tree of a whole vocabulary, and the tree search is limited to within only a single word period, the computational time of short-word tree searches is negligible and yet solves the miss problem presented by short words.

Figure 10:
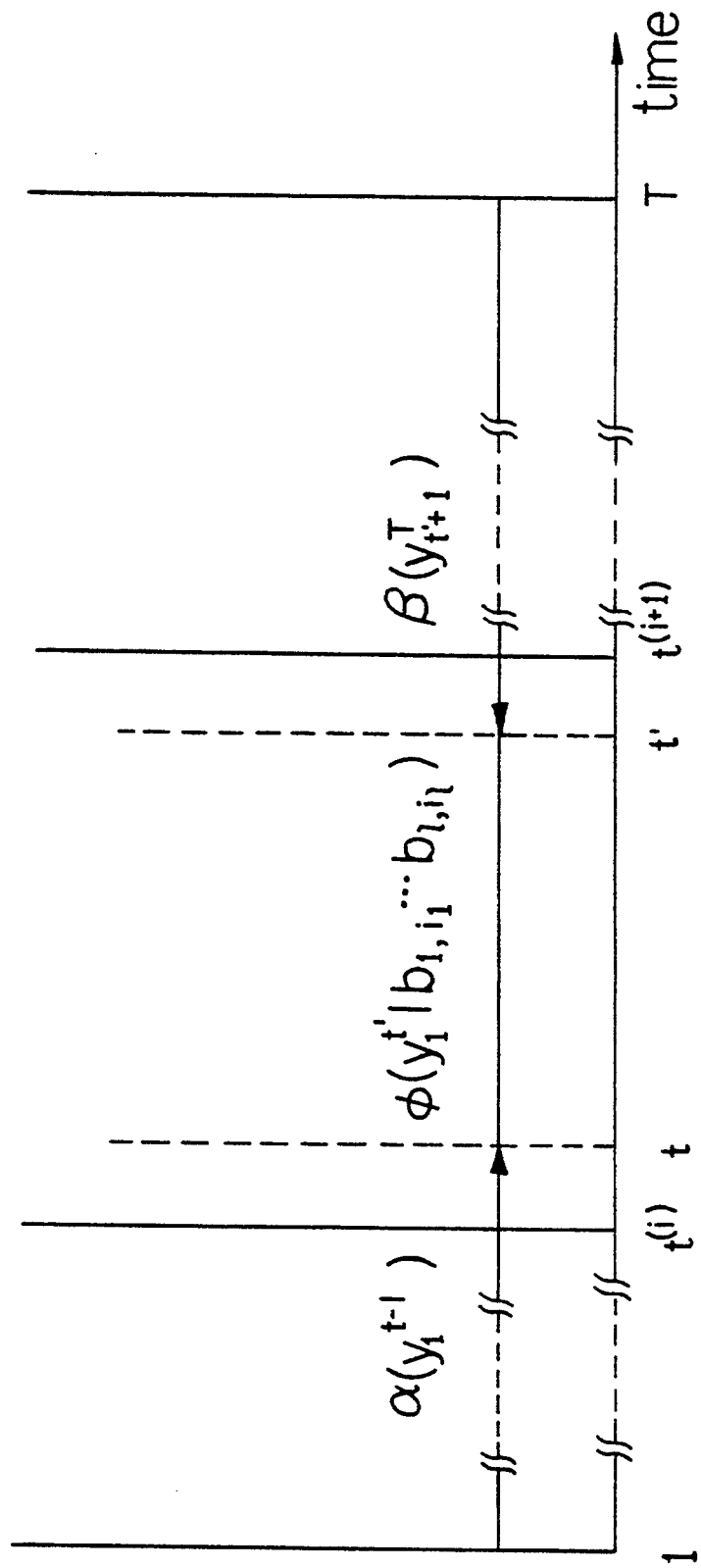
FIG. 10 illustrates a search for short words in between a pair of vowel centers.

The short-word tree searches are performed between each pair of adjacent vowel centers. FIG. 10 illustrates a search between the vowel center pair i and i+1. Define $$\log \phi_s(y_{t1}^t | b_{1,i_1}, \ldots, b_{1,i_l})$$

to be the maximum likelihood of $y_{ts}^t$ with the constraint that $y_1^t$ is decoded by the node sequence $(1,i_1), (2,i_2), \ldots, (l,i_l)$. Define $$\log \phi_e(y_{t1}^t | b_{1,i_1}, \ldots, b_{1,i_l})$$

to be the maximum likelihood of $y_{ts}^t$, with the constraint that $y_{ts}^t$ is decoded by the node sequence $(1,i_1), (2,i_2), \ldots, (l,i_l)$, and $(l,i_l)$ is a leaf node. For each frame t between the time indices of each adjacent vowel center pair $t^{(i)}$ and $t^{(i+1)}$, the computation proceeds in the following three steps:

1. Start a tree:

$$\log \phi_s(y_{ts}^{ts} | b_{1,i_1}) = \log \alpha((y_1^{ts-1}) + \log p(\chi_{ts} | b_{1,i_1});$$

2. Continue an existing path:

$$\log \phi_s(y_{ts}^t | b_{1,i_1}, \ldots, b_{l,i_l}) =$$
$$\max \{\log \phi_s(y_{ts}^{t-1} | b_{1,i_1}, \ldots, b_{l-1,i_{l-1}}),$$
$$\log \phi_s(y_{ts}^{t-1} | b_{1,i_1}, \ldots, b_{l,i_l})\} + \log p(x_t | b_{l,i_1});$$

3. End at a leaf node:

$$\log \phi_e(y_{ts}^t | b_{1,i_1}, \ldots, b_{l,i_l}) = \log \phi_s(y_{ts}^t | b_{1,i_1}, \ldots, b_{l,i_l}) +$$
$$\log \beta(y_{t+1}^T)$$
$$= \log \alpha(y_1^{t-1}) +$$
$$\log \phi(y_{ts}^t | b_{1,i_1}, \ldots, b_{l,i_l}) +$$
$$\log \beta(y_{t+1}^T).$$

The likelihood scores of $\phi_e$'s are sorted. The maximum is $$\phi^*_e = \max_{l', i'_1, i'_2, \ldots, i'_{l'}} \phi_e(y_{ts}^t | b_{1,i'_1}, \ldots, b_{l',i'_{l'}}).$$

A short word hypothesis is accepted if the ratio of its path score $\phi_e$ to the maximum path score is above a threshold, i.e., $$\log \frac{\phi_e(y_{ts}^t | b_{1,i_1}, \ldots, b_{1,i_l})}{\phi^*_e} > Th(t).$$

The start and end time of the accepted short words are added to the hypotheses of word-beginnings and word-endings in the word lattice.

As is illustrated in FIG. 1, the word lattice 19 generated from the word hypothesizer 17 is used in guiding a detailed top-down search 21. At each time frame, the top-down search 21 extends search paths into a set of words predicted by the grammar. The word lattice 19 from the word hypothesizer 17 is used to constrain such path extensions, so that only words consistent with the word-beginning hypotheses at the current time frame are extended. Similarly, the top-down search completes certain word paths at each time frame, and puts the completed words into records of sentence strings. The word-ending hypothesis in the word lattice 19 can also be used to constrain the completion of words so that only those in the hypothesis list are recorded.

In general, the constraint on path extensions into new words is the main factor in the speedup of the detailed top-down decoding, since the Viterbi beam search 21 also prunes away poorly-scored nodes. Furthermore, a somewhat more detailed acoustic match can be done in the word hypothesizer 17 to refine the lattice of word hypothesis, which will lead to further speedup in the detailed top-down decoding 21. Since the bidirectional tree search can be done in parallel, the additional detailed match will not be detrimental to the performance in speed in the word hypothesis of a large vocabulary.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A high-speed continuous speech-decoding system decoding a speech sentence by utilizing two-pass decoding, said system comprising:
   means for converting a speech utterance into a sequence of feature vectors;
   means for detecting stressed vowel centers in said sequence of feature vectors;
   means for generating a word lattice based on the detected stressed vowel centers; and
   means for performing a time-synchronous Viterbi beam search using the word lattice from said generating means to constrain said Viterbi beam search.

2. The continuous speech-decoding system of claim 1 wherein said means for generating a word lattice comprises:
   means for performing a time-synchronous bidirectional tree search around each detected stressed vowel center producing word hypotheses; and
   means for pruning the word hypotheses resulting from said bidirectional tree search in forward and backward directions.

3. The continuous speech-decoding system of claim 2 wherein said means for generating a word lattice further comprises:
   means for performing a tree search for short words.

4. The continuous speech-decoding system of claim 3 wherein said means for performing a short word tree search, searches between pairs of adjacent vowel centers using a short word dictionary tree.

5. The continuous speech-decoding system of claim 2 wherein said bidirectional tree search means comprises means for calculating the likelihood scores of a match between the feature vectors around the stressed vowel centers and a predetermined set of phone models; and
   said bidirectional tree search also comprises means for modeling each stressed vowel by a mixture density of a vowel phone model and a liquid-vowel syllable model.

6. The continuous speech-decoding system of claim 5 further comprising means utilizing two threshold conditions to discard low likelihood scores.

7. The continuous speech-decoding system of claim 6 wherein the first threshold condition of said two threshold discarding means is based on a maximum likelihood value from a current tree search at the current time frame.

8. The continuous speech-decoding system of claim 7 wherein the second threshold condition of said two threshold discarding means is based on the accumulated maximum likelihood score without tree path constraint of each time frame.

9. The continuous speech-decoding system of claim 8 wherein a new node word hypothesis is accepted if said first and second conditions are satisfied.

10. The continuous speech-decoding system of claim 9 wherein said new node word hypothesis comprises a node occurrence time and associated likelihood scores for either a left or a right half-word hypothesis.

11. The continuous speech-decoding system of claim 10 comprising means for comparing the node word hypothesis of each time frame from all vowel centers and keeping only the node word hypotheses with high likelihood scores.

12. The continuous speech-decoding system of claim 11 further comprising a forward-backward pruning means which operates from the first vowel center in said sequence of feature vectors to the last vowel center in said sequence of feature vectors for the forward direction and from the last vowel center to the first vowel center for the backward direction.

13. The continuous speech-decoding system of claim 12 wherein said forward-backward pruning means operates in the forward direction according to the steps:
(a) calculate the maximum likelihood scores of all possible paths that end with a stressed vowel for a certain word hypothesis;
(b) calculate the maximum likelihood scores of all paths that end with said certain word hypothesis; and
(c) sort all the maximum likelihood scores from step (b) into descending order and keep only the paths having the maximum likelihood scores that exceed a predetermined threshold.

14. The continuous speech-decoding system of claim 1 wherein said time-synchronous Viterbi beam search comprises a top-down Viterbi beam search.

15. The continuous speech-decoding system of claim 1 wherein said vowel center detecting means comprises means for selecting only those energy peaks represented by the feature vectors which are above a predetermined energy threshold or the feature vectors associated with the energy peaks that are acoustically matched to vowels and passing indices of the time locations of the selected energy peaks to said bidirectional tree search means.

16. In a high-speed continuous speech-decoding system for decoding speech sentences into decoded word strings, said system including means for converting a speech utterance into a sequence of feature vectors, the improvement therein comprising:
means for detecting stressed vowel centers in said sequence of feature vectors; and
means for generating a word lattice based on the detected stressed vowel centers.

17. The improvement of claim 16 wherein said means for generating a word lattice comprises:
means for performing a time-synchronous bidirectional tree search around each detected stressed vowel center producing word hypotheses; and
means for pruning the word hypotheses resulting from said bidirectional tree search in forward and backward directions.

18. The improvement of claim 17 wherein said means for generating a word lattice further comprises:
means for performing a tree search for short words.

19. The improvement of claim 18 wherein said short word tree search means searches only between each pairs of adjacent vowel centers using a short word dictionary tree.

20. The improvement of claim 17 wherein said bidirectional tree search means comprises:
means for calculating the likelihood scores of a match between the feature vectors around the stressed vowel centers and a predetermined set of phone models; and
said bidirectional tree search also comprises means for modeling each stressed vowel by a mixture density of a vowel phone model and a liquid-vowel syllable model.

21. The improvement of claim 20 further comprising means utilizing threshold conditions to discard low likelihood scores.

22. The improvement of claim 21 wherein a first threshold condition of said discarding means is based on a maximum likelihood value from a current tree search at the current time frame.

23. The improvement of claim 22 wherein a second threshold condition of said discarding means is based on an accumulated maximum likelihood score of each time frame without tree path constraint.

24. The improvement of claim 23 wherein a new node word hypothesis is accepted if said first and second conditions are satisfied.

25. The improvement of claim 24 wherein said new node word hypothesis comprises a node occurrence time and an associated likelihood score for a left and a right half-word hypothesis.

26. The improvement of claim 17 wherein said forward-backward pruning means comprises means for comparing the word hypothesis of each time frame from all vowel centers and keeping only the word hypotheses with high likelihood scores.

27. The improvement of claim 26 wherein said forward-backward pruning means operates from the first vowel center in said sequence of feature vectors to the last vowel center in said sequence of feature vectors for the forward direction and from the last vowel center to the first vowel center for the backward direction.

28. The improvement of claim 27 wherein said forward-backward pruning means operates in the forward direction including the steps:
(a) calculate the maximum likelihood scores of all possible paths that end with stressed vowel for a certain word hypothesis;
(b) calculate the maximum likelihood scores of all paths that end with said certain word hypothesis; and
(c) sort all the path ending likelihood scores from step (b) into descending order and keep only the path ending likelihood scores that exceed a predetermined threshold.

29. The improvement of claim 16 wherein said stressed vowel center detecting means comprises means for selecting only those energy peaks represented by said feature vectors which are above a predetermined energy threshold or the feature vectors associated with the energy peaks that are acoustically matched to vowels and passing the indices of the time location of the selected energy peaks to said bidirectional tree search means.

30. An improved high-speed continuous speech-decoding system for decoding speech sentences into decoded word strings, said system including means for converting a speech utterance into feature vectors, a word hypothesizer for generating a word lattice, and means for performing a Viterbi beam search, the improvement therein comprising:

said word hypothesizer including, means for representing a lexicon having a plurality of lexicon entries containing primary stressed vowels for said speech-decoding system in a vowel-centered tree which is rooted in the primary stressed-vowels of said lexicon entries.

* * * * *